(12) United States Patent
Furihata et al.

(10) Patent No.: US 8,989,409 B2
(45) Date of Patent: Mar. 24, 2015

(54) IMAGE DISPLAY DEVICE AND METHOD OF CONTROLLING THE SAME

(75) Inventors: Takeshi Furihata, Okaya (JP); Naoki Hayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 412 days.

(21) Appl. No.: 12/942,229

(22) Filed: Nov. 9, 2010

(65) Prior Publication Data

US 2011/0109542 A1    May 12, 2011

(30) Foreign Application Priority Data

Nov. 10, 2009    (JP) ................................. 2009-256761

(51) Int. Cl.
*H04R 3/00*    (2006.01)
*G03B 21/14*    (2006.01)

(52) U.S. Cl.
CPC . *G03B 21/14* (2013.01); *H04R 3/00* (2013.01); *H04R 3/007* (2013.01); *H04R 2420/05* (2013.01)
USPC ............... 381/122; 381/92; 381/58; 381/123; 345/156; 715/716; 715/727

(58) Field of Classification Search
USPC ............. 345/145; 715/716, 727; 84/610, 625; 381/58, 92, 122, 123
See application file for complete search history.

(56) References Cited

U.S. PATENT DOCUMENTS

| | | | | |
|---|---|---|---|---|
| 5,673,327 | A * | 9/1997 | Julstrom | 381/119 |
| 6,697,687 | B1 * | 2/2004 | Kasahara et al. | 700/94 |
| 7,094,087 | B2 * | 8/2006 | Larn | 439/188 |
| 7,912,501 | B2 * | 3/2011 | Johnson et al. | 455/556.1 |
| 8,165,701 | B2 * | 4/2012 | Aiso et al. | 700/94 |
| 2002/0180772 | A1 * | 12/2002 | Fado et al. | 345/709 |
| 2002/0180775 | A1 * | 12/2002 | Fado et al. | 345/727 |
| 2004/0094018 | A1 * | 5/2004 | Ueshima et al. | 84/610 |
| 2008/0021703 | A1 * | 1/2008 | Kawamura et al. | 704/226 |
| 2009/0036158 | A1 * | 2/2009 | Fujinawa et al. | 455/556.1 |
| 2009/0195308 | A1 * | 8/2009 | Lin | 330/136 |
| 2010/0125793 | A1 * | 5/2010 | Hayashi | 715/716 |

FOREIGN PATENT DOCUMENTS

| | | | |
|---|---|---|---|
| CN | 101071623 | A | 11/2007 |
| JP | 4-307900 | A | 10/1992 |
| JP | 6-0138433 | A | 5/1994 |
| JP | 8-293159 | A | 11/1996 |
| JP | 2003116193 | A * | 4/2003 |
| JP | 3862817 | B | 10/2006 |
| KR | 2002-059528 | A | 7/2002 |

OTHER PUBLICATIONS

Machine translation JP 2003116193 (from JPO).*
Machine translation of JP 2003116193 (Sep. 10, 2010).*

* cited by examiner

*Primary Examiner* — William Boddie
*Assistant Examiner* — Bryan Earles
(74) *Attorney, Agent, or Firm* — ALG Intellectual Property, LLC

(57) ABSTRACT

An image display device includes: a first audio signal input terminal to which a first audio signal is input from a microphone; and a control section adapted to control power supply from a power supply circuit to the microphone based on type information indicative of whether a type of the microphone to be connected to the first audio signal input terminal is a first type which is requiring power supply or a second type which is not requiring power supply.

4 Claims, 4 Drawing Sheets

IMAGE DISPLAY DEVICE AND METHOD OF CONTROLLING THE SAME

CROSS-REFERENCE

The entire disclosure of Japanese Patent Application No. 2009-256761 filed Nov. 10, 2009 is expressly incorporated by reference herein.

BACKGROUND

1. Technical Field

The present invention relates to an image display device and a method of controlling the image display device.

2. Related Art

As a microphone for supplying an image display device such as a projector with an audio signal, there can be cited a microphone (e.g., a dynamic microphone) requiring no power supply and a microphone (e.g., a plug-in-power microphone, an electret condenser microphone) requiring power supply.

In the case of the plug-in-power microphone, for example, the plug-in-microphone is not usable unless the power is supplied to the plug-in-power microphone from the main body of the image display device. In contrast, in the case of the dynamic microphone, if the power is supplied to the dynamic microphone from the main body, malfunction might be caused.

Therefore, image display devices are required to determine the type of the microphone, and to perform control corresponding to the type of the microphone. The recording device described in JP-A-8-293159, for example, detects the voltage of the terminal to which the microphone plug is connected to determine whether the type of the microphone is a stereo microphone or a monaural microphone.

However, according to the method of detecting the voltage of the terminal, it is not achievable for the image display device to determine which microphone is connected, a microphone requiring no power supply or a microphone requiring power supply.

SUMMARY

An advantage of some aspects of the invention is to solve the problem described above to thereby provide an image display device and a method of controlling the image display device capable of performing appropriate control in accordance with whether or not power supply is required for the microphone.

According to an aspect of the invention, there is provided an image display device including a first audio signal input terminal to which a first audio signal is input from a microphone, and a control section adapted to control power supply from a power supply circuit to the microphone based on type information indicative of whether a type of the microphone to be connected to the first audio signal input terminal is a first type which is requiring power supply or a second type which is not requiring power supply.

Further, according to another aspect of the invention, there is provided a method of controlling an image display device including a first audio signal input terminal to which a first audio signal is input from a microphone, the method including the steps of (a) determining a type of the microphone to be connected to the first audio signal input terminal based on type information indicative of whether the type of the microphone is a first type which is requiring power supply or a second type which is not requiring power supply, and (b) controlling power supply from a power supply circuit to the microphone in accordance with the type of the microphone determined.

According to the aspects of the invention, since the image display device can determine whether or not the type of the microphone to be connected to the audio signal input terminal is the type requiring power supply based on the type information, appropriate control can be performed in accordance with whether or not power supply is required in the microphone.

Further, it is also possible that the image display device further includes an image generation section adapted to generate a type selection image used for accepting an operation of selecting the type of the microphone, a display section adapted to display the type selection image in the case that a microphone connected to the projector is detected, an information input section adapted to accept an input of first selection information indicative of a selection result of the type of the microphone, a determination section adapted to determine the selection result of the type of the microphone based on the first selection information, and an update section adapted to update type data indicative of the type of the microphone in accordance with the determination by the determination section after the selection result of the type of the microphone is changed, and the control section controls the power supply from the power supply circuit to the microphone based on the type data.

Further it is also possible that the control method further includes the steps of (c) generating a type selection image used for accepting an operation of selecting the type of the microphone, (d) displaying the type selection image in the case that a microphone connected to the projector is detected, (e) accepting an input of first selection information indicative of a selection result of the type of the microphone, (f) determining the selection result of the type of the microphone based on the first selection information, (g) updating type data indicative of the type of the microphone in accordance with the determination after the selection result of the type of the microphone is changed, and (h) controlling the power supply from the power supply circuit to the microphone based on the type data.

According to the aspects of the invention, since the image display device prompts the user to select the microphone type, and then performs the power supply control in accordance with the selection, it becomes possible for the image display device to prevent an erroneous determination of the type to perform more appropriate control. Moreover, because the image display device displays the type selection image to prompt the operator to select the type of the microphone, configuration error is exterminated.

Further, it is also possible that the image generation section generates a confirmation image used for accepting an operation of selecting whether or not it is allowable to change the type of the microphone in the type data to the first type when the first type is selected with respect to the type selection image, the display section displays the confirmation image, the information input section accepts an input of second selection information indicative of whether or not it is allowable to change the type of the microphone to the first type, the determination section makes determination to determine whether or not the selection indicating that the change to the first type is allowable is performed, and the determination is performed based on the second selection information, and the update section updates the type data so as to indicate that the type of the microphone is the first type if the selection is indicating that the change to the first type is allowable.

Further it is also possible that the control method further includes the steps of (i) generating a confirmation image used for accepting an operation of selecting whether or not it is allowable to change the type of the microphone in the type data to the first type when the first type is selected with respect to the type selection image, (j) displaying the confirmation image, (k) accepting an input of second selection information indicative of whether or not it is allowable to change the type of the microphone to the first type, (l) making determination to determine whether or not the selection indicating that the change to the first type is allowable is performed, and the determination is performed based on the second selection information, and (m) updating the type data so as to indicate that the type of the microphone is the first type if the selection is indicating that the change to the first type is allowable.

According to the aspects of the invention, the image display device prompts the user to check whether or not the change to the first type is allowable when the user selects the first type, and thus, it becomes possible for the image display device to prevent erroneous selection by the user to perform more appropriate control.

Further, it is also possible that the image display device further includes a first audio amplifier section adapted to amplify the first audio signal to generate a first amplified audio signal, a second audio signal input terminal to which a second audio signal is input, an adjustment section adapted to adjust a mixture ratio between the first amplified audio signal and the second audio signal, a mixing section adapted to mix the first amplified audio signal and the second audio signal with each other to generate a mixed audio signal, and a sound output section adapted to output a sound based on the mixed audio signal, and the control section controls the adjustment section to adjust the mixture ratio so that a ratio of the first amplified audio signal to the second audio signal is reduced in a case in which the type of the microphone is the first type compared to a case in which the type of the microphone is the second type.

Further it is also possible that the control method further includes the steps of (n) providing a second audio signal input terminal to which a second audio signal is input, (o) adjusting a mixture ratio between a first amplified audio signal obtained by amplifying the first audio signal and the second audio signal so that a ratio of the first amplified audio signal to the second audio signal is reduced in a case in which the type of the microphone is the first type compared to a case in which the type of the microphone is the second type, (p) generating the first amplified audio signal by amplifying the first audio signal, (q) mixing the first amplified audio signal and the second audio signal with each other to generate a mixed audio signal, and (r) outputting a sound based on the mixed audio signal.

According to the aspects of the invention, the image display device adjusts the mixture ratio in accordance with the type of the microphone, thereby making it possible to reduce occurrence of noise to perform more appropriate control.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some embodiments of the invention applied to a projector will be described with reference to the accompanying drawings. It should be noted that the embodiments described below do not at all limit contents of the invention as set forth in the appended claims. Further, each of the constituents shown in the embodiments below is not necessarily indispensable as the means for solving the problem in the invention set forth in the appended claims.

First Embodiment

Figure 1:
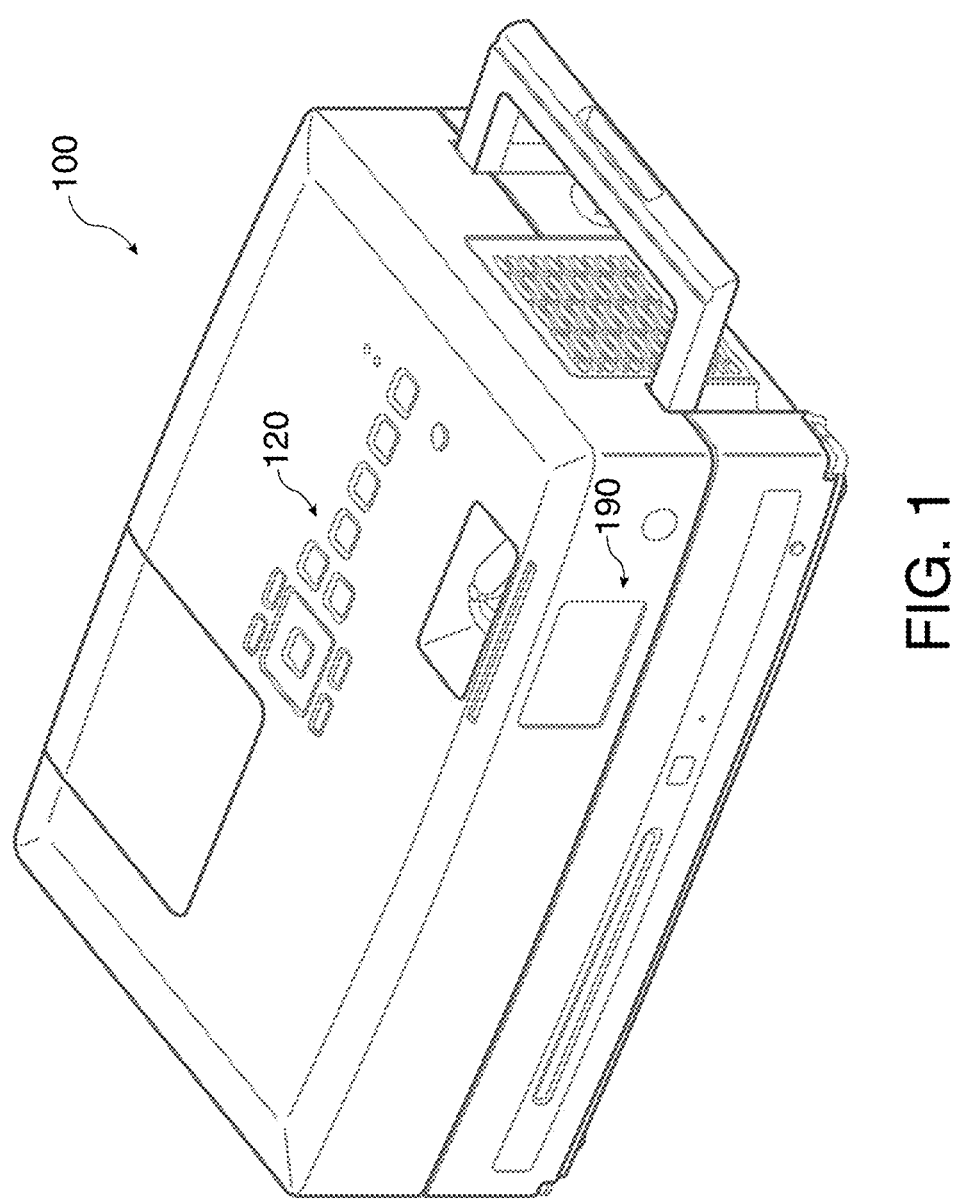
FIG. 1 is an external view of a projector according to a first embodiment of the invention.

FIG. 1 is an external view of a projector 100 according to a first embodiment. The projector 100 is a portable projector incorporating a DVD drive unit. A rear panel of the projector 100 is provided with a microphone input terminal to which a microphone sound is input, an audio terminal, a video terminal, a component terminal, a USB terminal, and so on.

Figure 2:
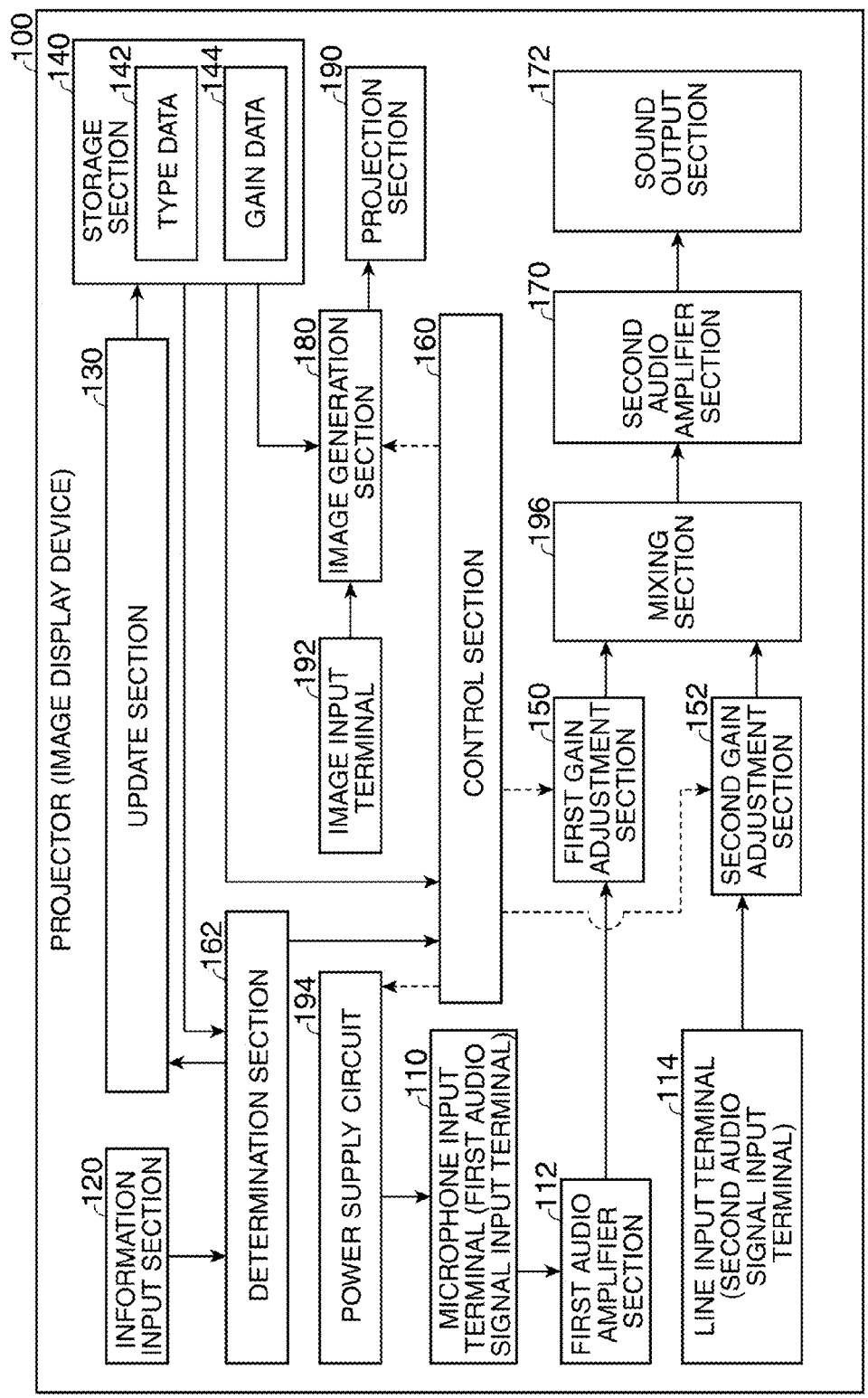
FIG. 2 is a functional block diagram of the projector according to the first embodiment.

The projector 100 according to the present embodiment has a function of adjusting a gain representing mixture ratio of the sound in accordance with the type (either one of a plug-in-power microphone corresponding to a first type which is requiring power supply and a dynamic microphone corresponding to a second type which is not requiring power supply in the present embodiment) of the microphone connected to the microphone input terminal. Then, functional blocks of the projector 100 having such a function will be explained. FIG. 2 is a functional block diagram of the projector 100 according to the first embodiment. The projector 100 is configured including a microphone input terminal 110 as a first audio signal input terminal to be coupled to a microphone terminal connected to a microphone, a first audio amplifier section 112 for amplifying a microphone audio signal from the microphone input terminal 110 to generate a first amplified audio signal, and a line input terminal 114 as a second audio signal input terminal.

Further, the projector 100 is configured including a first gain adjustment section 150 for adjusting the gain of the first amplified audio signal from the first audio amplifier section 112, a second gain adjustment section 152 for adjusting the gain of the second audio signal from the line input terminal 114, a mixing section 196 for performing mixing of the first amplified audio signal from the first gain adjustment section 150 and the second audio signal from the second gain adjustment section 152, a second audio amplifier section 170 for amplifying the audio signal from the mixing section 196, and a sound output section 172 for outputting a sound based on a second amplified audio signal from the second audio amplifier section 170.

Further, the projector 100 is configured including an information input section 120 to which the information from a remote controller or an operation panel of the main body of the projector 100 is input, a storage section 140 for storing type data 142 as a kind of type information, gain data 144, and so on, an update section 130 for updating the type data 142 and so on, a power supply circuit 194 for supplying the microphone with power via the microphone input terminal 110, a control section 160 for controlling the power supply circuit 194, the first gain adjustment section 150, and so on, a determination section 162 for performing various determinations, an image input terminal 192 to which an image signal is input, an image generation section 180 for generating an image in accordance with the image signal and so on, and a projection section 190 for projecting the image.

It should be noted that the type data 142 is the data indicative of, for example, whether the microphone to be connected to the microphone input terminal 110 is a plug-in-power microphone requiring power supply or a dynamic microphone requiring no power supply. Further, the gain data 144 is assumed to be the data on which the setting of reducing the ratio of the first amplified audio signal to the second audio signal in the case in which the microphone is a plug-in-power microphone compared to the case in which the microphone is not a plug-in-power microphone is performed.

More specifically, the gain data 144 can be for keeping the second audio signal unchanged while reducing the first amplified audio signal to be 50 through 90% of the original value in the case in which the microphone is a plug-in-power microphone, and keeping both of the second audio signal and the first amplified audio signal unchanged in the case in which the microphone is a dynamic microphone. Further, the gain data 144 can be the data indicative of the gain value of the first gain adjustment section 150 and the gain value of the second gain adjustment section 152 corresponding to each of the microphone types.

Further, an audio signal from an external device (e.g., a CD player, a DVD player, and a PC), an audio signal from the built-in DVD drive unit, an audio signal from a USB memory, or the like is input to the line input terminal 114.

Further, the projector 100 can function as these sections using the following hardware. For example, the projector 100 can use an infrared beam reception unit or the like for receiving an infrared beam from a remote controller as the information input section 120, a CPU or the like as the update section 130, the control section 160, the determination section 162, a nonvolatile memory or the like as the storage section 140, an image processing circuit or the like as the image generation section 180, a lamp, a liquid crystal panel, a liquid crystal drive circuit, a lens, and so on as the projection section 190, and a digital signal processor (DSP) or the like functioning as an audio controller as the first gain adjustment section 150 and the second gain adjustment section 152. Other sections are typical terminals, amplifiers, speakers, and so on.

Figure 3:
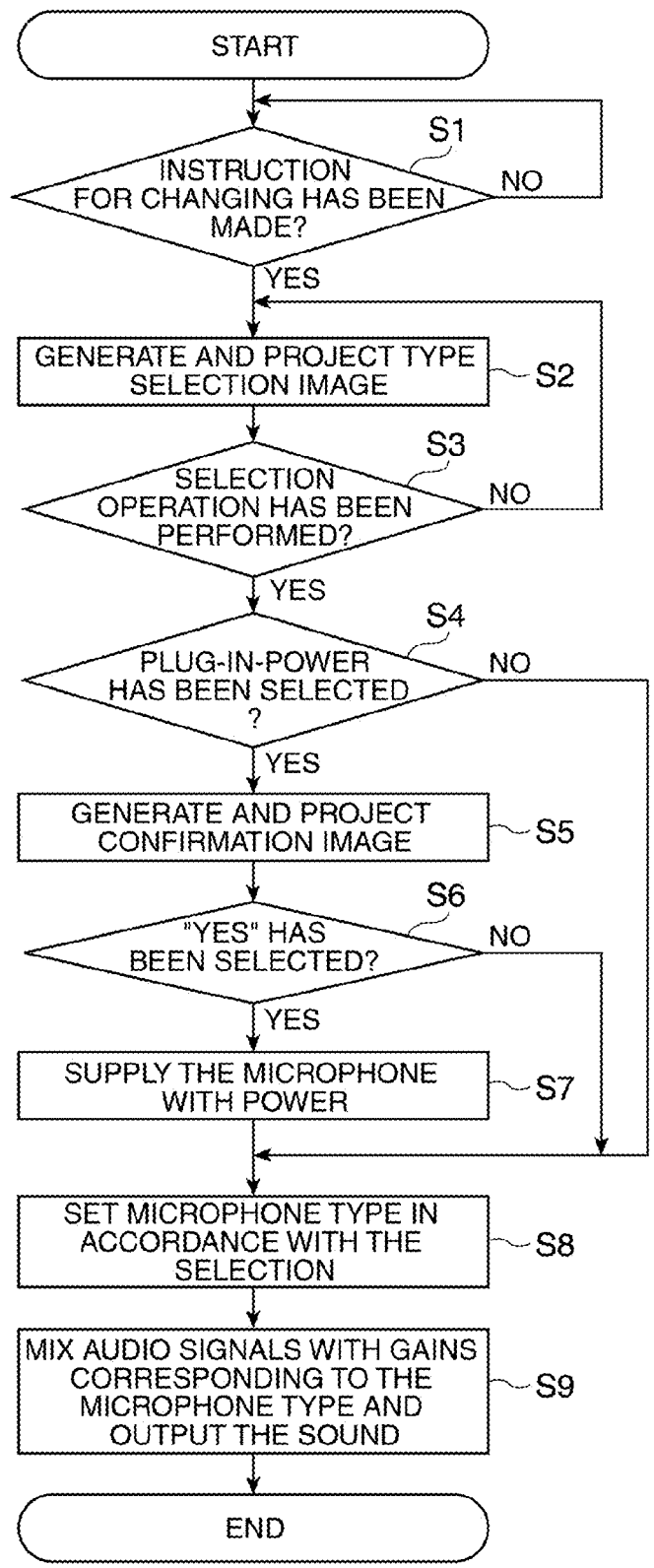
FIG. 3 is a flowchart showing a control procedure in the first embodiment.

Then, a procedure of controlling the power supply to the microphone using these sections will be explained. FIG. 3 is a flowchart showing the control procedure in the first embodiment. When changing the type of the microphone to be connected to the projector 100, the user operates the remote controller or the operation panel on the main body of the projector 100 to make an instruction for changing the microphone type. The determination section 162 determines (step S1) whether or not the instruction for changing the microphone type has been made based on the information from the information input section 120.

If it is determined that the instruction for changing the microphone type has been made, the control section 160 controls the image generation section 180 to generate a type selection image for receiving the operation of selecting the microphone type, the image generation section 180 generates the type selection image based on the type data 142 and so on, and the projection section 190 projects the type selection image (step S2).

Figure 4:
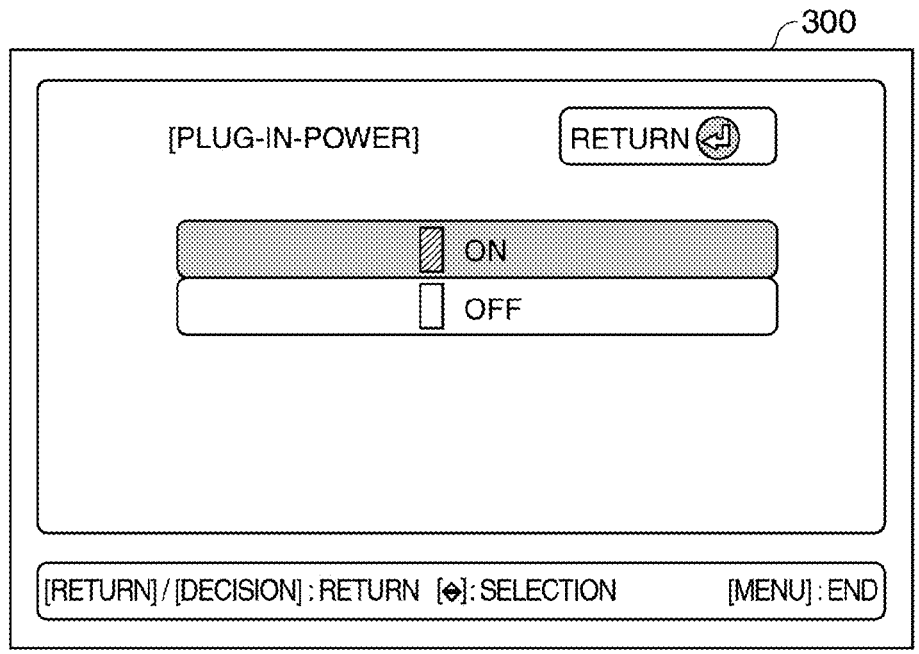
FIG. 4 is a diagram showing an example of a type selection image in the first embodiment.

FIG. 4 is a diagram showing an example of the type selection image 300 in the first embodiment. The type selection image 300 is an image showing an option (ON) indicating that the microphone to be connected to the projector 100 is a plug-in-power microphone, an option (OFF) indicating that the microphone is not a plug-in-power microphone, and so on. Here, it is assumed that in the initial state of the present embodiment, the type data 142 indicates that the microphone is not a plug-in-power microphone, and the option indicating that the microphone is not a plug-in-power microphone has been selected in the type selection image 300.

The user operates an UP/DOWN key of the remote controller or the main body of the projector 100 to make the selection. The determination section 162 determines (step S3) whether or not the user has performed the selection operation based on the information (first selection information indicative of the selection result of the microphone type) from the information input section 120, and then determines (step S4) whether or not the user has selected the option indicating that the microphone is a plug-in-power microphone.

If a plug-in-power microphone is selected, the control section 160 controls the image generation section 180 to generate a confirmation image for accepting an operation of selecting whether or not the microphone is compliant with the plug-in-power scheme, and then the projection section 190 projects the confirmation image (step S5).

Figure 5:
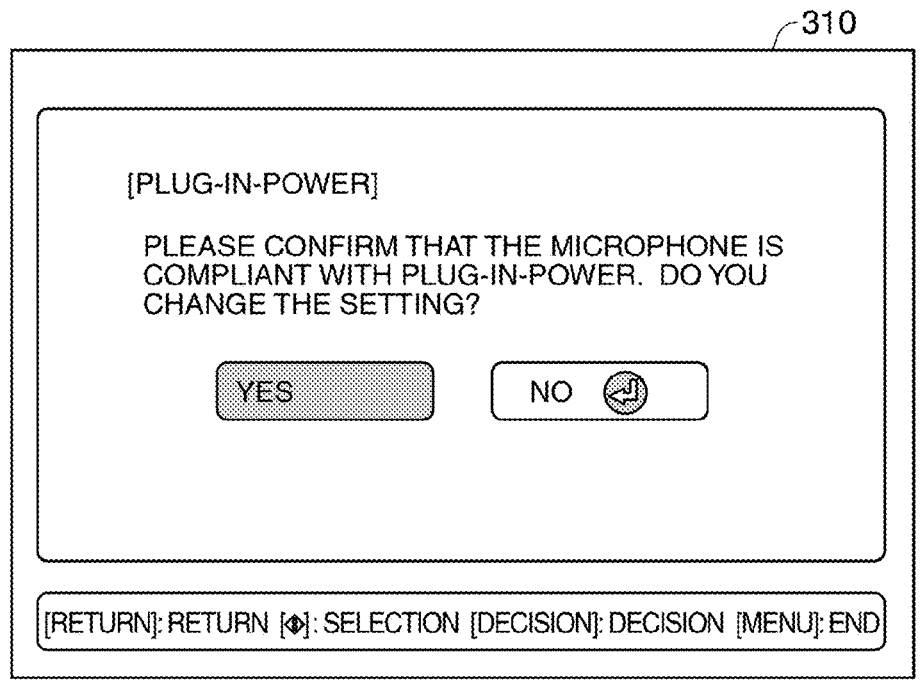
FIG. 5 is a diagram showing an example of a confirmation image in the first embodiment.

FIG. 5 is a diagram showing an example of the confirmation image 310 in the first embodiment. The confirmation image 310 is an image showing a character string of "PLEASE CONFIRM THAT THE MICROPHONE IS COMPLIANT WITH PLUG-IN-POWER. DO YOU CHANGE THE SETTING?," an option indicative of "YES," and an option indicative of "NO."

It should be noted that the type selection image 300 and the confirmation image 310 can be an on-screen-display (OSD) image, and the image generation section 180 can generate an image obtained by overlapping the OSD image showing the type selection image 300 or the confirmation image 310 on the image based on the image signal from the image input terminal 192.

The determination section 162 determines (step S6) whether or not the user performs the operation of selecting the option indicative of "YES" based on the information (second selection information indicative of whether or not the microphone type can be changed to the dynamic microphone) from the information input section 120.

If the operation of selecting the option indicative of "YES" is performed, the control section 160 controls the power supply circuit 194 to supply the microphone coupled to the microphone input terminal 110 with the power via the microphone input terminal 110 (step S7).

Further, if the operation of changing the type is performed on the type selection image 300, the update section 130 updates the type data 142 based on the determination result of the determination section 162 to thereby perform setting of the microphone type in accordance with the selection (step S8).

The control section 160 controls the first gain adjustment section 150 and the second gain adjustment section 152 based on the type data 142 and the gain data 144 so as to obtain the mixture ratio corresponding to the microphone type, and the mixing section 196 mixes the first amplified audio signal and the second audio signal having the gains thus adjusted with each other, the second audio amplifier section 170 amplifies the audio signal from the mixing section 196 to generate the second amplified audio signal, and the sound output section 172 outputs the sound based on the second amplified audio signal (step S9).

As described above, according to the present embodiment, since the projector 100 can determine whether or not the type of the microphone connected to the microphone input terminal 110 is a type requiring power supply based on the type information represented by the type data 142, the projector 100 can perform appropriate control in accordance with whether or not the microphone requires the power supply, and thus, occurrence of malfunction in the microphone can be reduced.

Further, according to the present embodiment, since the projector 100 projects the type selection image 300 to thereby prompt the user to select the microphone type, and then performs the power supply control in accordance with the selection, it becomes possible for the projector 100 to prevent an erroneous determination of the type to perform more appropriate control.

Further, according to the present embodiment, the projector 100 projects the confirmation image 310 to thereby prompt the user to check whether or not the change to the plug-in-power type is allowable when the user selects the plug-in-power type, and thus, it becomes possible for the projector 100 to prevent erroneous selection by the user to perform more appropriate control.

Further, according to the present embodiment, by using the gain data 144 on which the setting for decreasing the ratio of the first amplified audio signal to the second audio signal in the plug-in-power case compared to the non-plug-in-power case is performed, it becomes possible for the projector 100 to adjust the mixture ratio in accordance with the microphone type to thereby reduce generation of noise, and thus perform more appropriate control.

Other Embodiments

It should be noted that applications of the invention are not limited to the embodiment described above, but various modifications thereof are possible. For example, the type data 142 and the gain data 144 are not necessarily fundamental. For example, it is also possible that in the control section 160, type information indicative of the microphone type is input to the information input section 120 from an external device such as the remote controller for accepting the selection by the user or an amplifier storing the information indicative of the microphone type, and the control section 160 performs, for example, the power supply control to the microphone based on the type information.

Further, it is also possible for the projector 100 to detect the input level of each of the audio signals, and then control the first audio amplifier section 112 and the second audio amplifier section 170 in accordance with the input level.

Further, the projector 100 retrieves a program stored in an information storage medium to thereby function as the respective sections of the projector 100 described above. Further, the image display device is not limited to the projector 100, but can be a television set or a karaoke system, for example.

Further, it is also possible to display a type selection image by detecting a microphone connected to the microphone input terminal 110.

Further, the projector 100 is not limited to a liquid crystal projector (a transmissive type or a reflective type such as LCOS), but can be, for example, a projector using a digital micromirror device. Further, the function of the projector 100 can be distributed in two or more devices (e.g., a PC and a projector).

What is claimed is:

1. An image display device comprising:
   a first audio signal input terminal to which a first audio signal is input from a microphone;
   a second audio signal input terminal to which a second audio signal is input from a device other than a microphone;
   a control section adapted to control power supply from a power supply circuit to the microphone based on type data representing a user-selected option indicative of whether a type of the microphone to be connected to the first audio signal input terminal is a first type which requires power supply or a second type which does not require power supply;
   an image generation section adapted to generate a type selection image used for accepting an operation of selecting the type of the microphone;
   a display section adapted to display the type selection image upon a detection of the microphone being connected to a projector;
   an information input section adapted to accept an input of first selection information indicative of a selection result of the type of the microphone;
   a determination section adapted to determine the selection result of the type of the microphone based on the first selection information;
   an update section adapted to update type data indicative of the type of the microphone in accordance with the determination by the determination section after the selection result of the type of the microphone is changed,
   a first audio amplifier section adapted to amplify the first audio signal to generate a first amplified audio signal;
   an adjustment section adapted to adjust a mixture ratio between the first amplified audio signal and the second audio signal;
   a mixing section adapted to mix the first amplified audio signal and the second audio signal with each other to generate a mixed audio signal; and
   a sound output section adapted to output a sound based on the mixed audio signal,
   wherein the control section controls the power supply from the power supply circuit to the microphone based on the type data, and controls the adjustment section to adjust the mixture ratio so that a ratio of the first amplified audio signal to the second audio signal is reduced in a case in which the type of the microphone is the first type compared to a case in which the type of the microphone is the second type.

2. The image display device according to claim 1, wherein
   the image generation section generates a confirmation image used for accepting an operation of selecting whether or not it is allowable to change the type of the microphone in the type data to the first type when the first type is selected with respect to the type selection image,
   the display section displays the confirmation image,
   the information input section accepts an input of second selection information indicative of whether or not it is allowable to change the type of the microphone to the first type,
   the determination section makes determination to determine whether or not the selection indicating that the change to the first type is allowable is performed, and the determination is performed based on the second selection information, and
   the update section updates the type data so as to indicate that the type of the microphone is the first type if the selection is indicating that the change to the first type is allowable.

3. A method of controlling an image display device including a first audio signal input terminal to which a first audio signal is input from a microphone and a second audio signal input terminal to which a second audio signal is input, the method comprising:
   (a) determining a type of the microphone to be connected to the first audio signal input terminal based on type data representing a user-selected option indicative of whether the type of the microphone is a first type which requires power supply or a second type which does not require power supply;
(b) controlling power supply from a power supply circuit to the microphone in accordance with the type of the microphone determined;
(c) generating a type selection image used for accepting an operation of selecting the type of the microphone;
(d) displaying the type selection image upon a detection of the microphone being connected to a projector;
(e) accepting an input of first selection information indicative of a selection result of the type of the microphone;
(f) determining the selection result of the type of the microphone based on the first selection information;
(g) updating type data indicative of the type of the microphone in accordance with the determination after the selection result of the type of the microphone is changed; and
(h) controlling the power supply from the power supply circuit to the microphone based on the type data,
(i) adjusting a mixture ratio between a first amplified audio signal, obtained by amplifying the first audio signal, and the second audio signal so that a ratio of the first amplified audio signal to the second audio signal is reduced in a case in which the type of the microphone is the first type compared to a case in which the type of the microphone is the second type;
(j) generating the first amplified audio signal by amplifying the first audio signal;
(k) mixing the first amplified audio signal and the second audio signal with each other to generate a mixed audio signal; and
(l) outputting a sound based on the mixed audio signal,
wherein the second audio signal is input from a device other than a microphone.

4. The method according to claim 3, further comprising:
(m) generating a confirmation image used for accepting an operation of selecting whether or not it is allowable to change the type of the microphone in the type data to the first type when the first type is selected with respect to the type selection image;
(n) displaying the confirmation image;
(o) accepting an input of second selection information indicative of whether or not it is allowable to change the type of the microphone to the first type;
(p) making determination to determine whether or not the selection indicating that the change to the first type is allowable is performed, and the determination is performed based on the second selection information; and
(q) updating the type data so as to indicate that the type of the microphone is the first type if the selection is indicating that the change to the first type is allowable.

* * * * *